(12) United States Patent
Ohn

(10) Patent No.: US 10,214,217 B2
(45) Date of Patent: Feb. 26, 2019

(54) METHOD AND SYSTEM FOR RELEASING BAULKING OF TRANSMISSION GEAR IN HYBRID VEHICLE

(71) Applicant: Hyundai Motor Company, Seoul (KR)

(72) Inventor: Hyung Seuk Ohn, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 311 days.

(21) Appl. No.: 15/189,308

(22) Filed: Jun. 22, 2016

(65) Prior Publication Data
US 2017/0253248 A1    Sep. 7, 2017

(30) Foreign Application Priority Data

Mar. 7, 2016 (KR) .................. 10-2016-0027114

(51) Int. Cl.
| | |
|---|---|
| *B60W 10/02* | (2006.01) |
| *B60W 10/08* | (2006.01) |
| *B60W 10/11* | (2012.01) |
| *B60W 20/00* | (2016.01) |
| *B60W 30/19* | (2012.01) |

(52) U.S. Cl.
CPC ............ *B60W 30/19* (2013.01); *B60W 10/02* (2013.01); *B60W 10/08* (2013.01); *B60W 10/11* (2013.01); *B60W 20/00* (2013.01); *B60W 2510/081* (2013.01); *B60W 2520/04* (2013.01); *B60W 2520/10* (2013.01); *B60W 2710/022* (2013.01); *B60W 2710/081* (2013.01); *B60W 2710/083* (2013.01)

(58) Field of Classification Search
CPC ...... B60W 20/00; B60W 10/11; B60W 10/02; B60W 10/06; B60W 10/08; B60W 2710/022; B60W 2710/081; B60W 2710/083; B60W 2510/081; B60W 2520/10; B60W 2520/04; Y10T 477/26; Y10T 477/33
See application file for complete search history.

(56) References Cited

U.S. PATENT DOCUMENTS

| | | | |
|---|---|---|---|
| 5,595,550 A | 1/1997 | Jarvis et al. | |
| 9,057,433 B2 * | 6/2015 | Sung | ................. B60W 10/08 |
| 9,702,420 B2 * | 7/2017 | Yoon | ................. F16D 21/02 |

(Continued)

FOREIGN PATENT DOCUMENTS

| | | |
|---|---|---|
| JP | 2006-046516 A | 2/2006 |
| JP | 2007-321786 A | 12/2007 |

(Continued)

*Primary Examiner* — Jacob S. Scott
*Assistant Examiner* — Lillian T Nguyen
(74) *Attorney, Agent, or Firm* — Mintz Levin Cohn Ferris Glovsky and Popeo, P.C.; Peter F. Corless

(57) ABSTRACT

A system and method for releasing baulking of a transmission gear of a hybrid vehicle are provided. The method includes comparing a stroke of a gear actuator with a first target value while increasing the stroke of the gear actuator when gear shifting is requested. Additionally, the method includes detecting whether the vehicle is in a stop state, in response to determining that the stroke of the gear actuator is less than a first target value. A motor torque is then increased in response to determining that the vehicle is in a stop state and the stroke of the clutch actuator is increased to be a second target value.

12 Claims, 2 Drawing Sheets

(56) References Cited

U.S. PATENT DOCUMENTS

2007/0066441 A1* 3/2007 Otsubo ................... F16H 59/68
                                                                            477/97
2013/0237373 A1* 9/2013 Kaneko ................... F16D 48/06
                                                                           477/172

FOREIGN PATENT DOCUMENTS

| JP | 2014-149023 A | 8/2014 |
| KR | 10-2011-0007036 A | 1/2011 |
| KR | 2011-0011250 A | 2/2011 |
| KR | 2012-0038797 A | 4/2012 |
| KR | 2013-0038501 A | 4/2013 |

* cited by examiner

METHOD AND SYSTEM FOR RELEASING BAULKING OF TRANSMISSION GEAR IN HYBRID VEHICLE

CROSS REFERENCE TO RELATED APPLICATION

The present application claims priority to Korean Patent Application No. 10-2016-0027114, filed on Mar. 7, 2016, the entire contents of which is incorporated herein for all purposes by this reference.

BACKGROUND

1. Technical Field

The present invention relates to a method and system for releasing baulking of a transmission gear when a hybrid vehicle is in a stop state, and more particularly to a method and system for releasing baulking of a transmission gear of a hybrid vehicle by increasing a motor torque and controlling a stroke of a actuator clutch when the hybrid vehicle is in a stop state.

2. Description of the Related Art

Generally, a transmission is installed between a clutch and a propeller shaft to increase or decrease an engine torque in response to a change in a driving condition of a vehicle. A manual transmission (MT) causes a baulking phenomenon between gear trains in association with transmission timing upon a transmission of each stage. Much of the baulking phenomenon occurs due to a flick between the gear trains when timing of a clutch manipulation and timing of a shift manipulation by a driver mismatch (e.g., do not correspond to) each other.

In the existing gasoline vehicle in which an engine is mounted, the foregoing baulking may be released by controlling a stroke of a clutch actuator based on idle rotation speed of the engine independent of whether the vehicle is driving or stopping. However, as an interest in environment is increasing, a hybrid vehicle that may be driven by power of an engine and a motor has been actively developed.

However, in the hybrid vehicle to which an automatic manual transmission, i.e., a dual clutch transmission (DCT) is applied, when a gear baulking phenomenon occurs in a stop state, the engine stops and therefore a speed of an input shaft of a transmission becomes 0. As a result, a gear is misaligned even though the stroke of the clutch actuator is controlled, and therefore there is the problem in that the baulking phenomenon is not released. Therefore, in the existing DCT hybrid vehicle, when the baulking phenomenon occurs while the vehicle is stopping, limp-home driving is made only by one of an even stage and an odd stage, and thus drivability of the vehicle deteriorates.

The contents described as the related art have been provided merely for assisting in the understanding for the background of the present invention and should not be considered as corresponding to the related art known to those skilled in the art.

SUMMARY

An object of the present invention is to provide a method and system for releasing baulking of a transmission gear of a hybrid vehicle by increasing a motor torque and controlling a stroke of a clutch actuator when the hybrid vehicle is in a stop state and a gear baulking phenomenon occurs.

According to an exemplary embodiment of the present invention, a method for releasing baulking of a transmission gear of a hybrid vehicle may include: comparing, by a controller, a stroke of a gear actuator with a first target value while increasing the stroke of the gear actuator when gear shifting is requested; detecting, by the controller, whether the vehicle is in a stop state, in response to determining in the comparison that the stroke of the gear actuator is less than a first target value; increasing, by the controller, a motor torque, in response to determining that the vehicle is in a stop state; and after increasing the motor torque, adjusting, by the controller, the stroke of the clutch actuator to be a second target value.

In response to detecting that the vehicle does not stop, the controller may perform the adjusted of the stroke. In addition, the controller may be configured to detect that the vehicle is in a stop state when a vehicle speed or a rotation speed of a motor is 0. In the increasing, of motor torque the controller may be configured to transmit a signal requesting the increase in the motor torque to a hybrid control unit (HCU) but transmit the signal to allow the rotation speed of the motor to be equal to or less than a set value. The second target value may be set to be equal to or greater than a stroke value that corresponds to a touch point of a clutch. After the adjustment of the stroke, the controller may be configured to repeat the comparison process.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, a method for releasing baulking of a transmission gear of a hybrid vehicle according to an exemplary embodiment of the present invention will be described with reference to the accompanying drawings.

Figure 1:
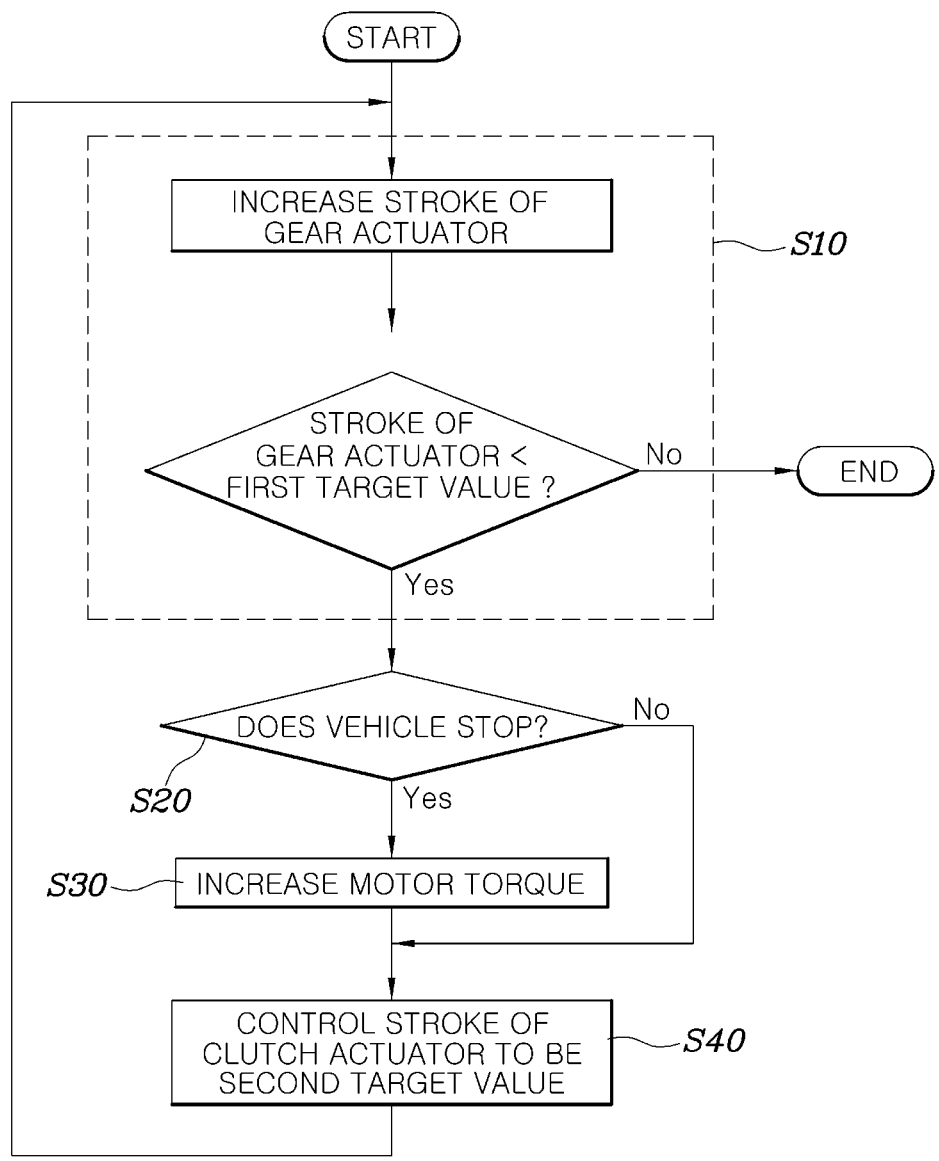
FIG. 1 is a flow chart illustrating a method for releasing baulking of a transmission gear of a hybrid vehicle according to an exemplary embodiment of the present invention.
Figure 2:
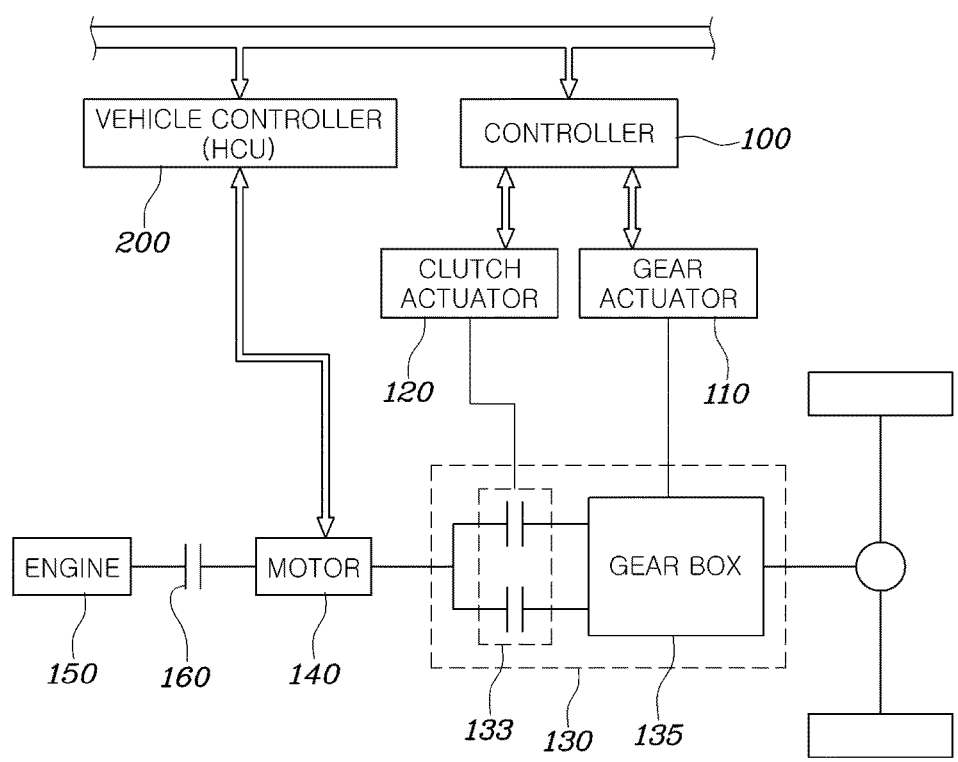
FIG. 2 is a diagram illustrating an apparatus for releasing baulking of a transmission gear of a hybrid vehicle according to an exemplary embodiment of the present invention.

FIG. 1 is a flow chart illustrating a method for releasing baulking of a transmission gear of a hybrid vehicle according to an exemplary embodiment of the present invention and FIG. 2 is a flow chart illustrating an apparatus for releasing baulking of a transmission gear of a hybrid vehicle according to an exemplary embodiment of the present invention.

Referring to FIGS. 1 and 2, the method for releasing baulking of a transmission gear of a hybrid vehicle may include: comparing, by a controller 100, a stroke of a gear actuator 110 with a first target value when gear shifting is requested (S10); detecting, by the controller 100, whether the vehicle is in a stop state, in response to determining that the stroke of the gear actuator 110 is less than the first target value (S20); increasing, by the controller 100, a motor torque, in response to determining that the vehicle is in a stop state (S30); and after the increasing (S30), adjusting, by the controller 100, the stroke of the clutch actuator 120 to be a second target value (S40).

The controller 100 may be a transmission control unit (TCU) configured to operate a transmission 130 and transmit and receive a control signal to and from a clutch actuator 120 and a gear actuator 110 that are each installed to drive a transmission clutch 133 and a gear box 135 installed in the transmission 130. Further, a hybrid vehicle based on the technology may be driven in a TMED scheme, in which a power train is configured in order of an engine 150, an engine clutch 160, a motor 140, the transmission 130, and a differential apparatus.

First, when requesting gear shifting, the controller 100 may be configured to increase the stroke of the gear actuator 110 to attempt a gear engagement. In particular, the controller 100 may be configured to compare the stroke of the gear actuator 110 with the first target value to determine a baulking state of the foregoing hybrid vehicle (S10). The first target value may be set to be the stroke value of the gear actuator 110 when a targeted transmission gear in the gear box 135 is engaged. This may vary based on a configuration of the transmission or a vehicle and therefore is not limited to a specific value.

For example, when the stroke of the gear actuator 110 is less than the first target value, the controller 100 may be configured to determine that the baulking phenomenon that a normal gear engagement is not made occurs, and to the contrary, in response to detecting that the stroke of the gear actuator 110 is equal to or greater than the first target value, the controller may be configured to determine normal gear engagement, such that a logic of the present invention ends.

As described above, as a result of performing the comparison (S10), when the stroke of the gear actuator 110 is less than the first target value, the controller 100 may be configured to determine that the baulking phenomenon occurs to determine whether the vehicle is in a stop state (S20). In other words, the controller may be configured to determine whether to increase the motor torque. In response to determining that the stroke of the gear actuator 110 is less than the first target value and the vehicle is in a stop state, the engine 150 is in a stop state, and therefore the controller 100 may be configured to increase the motor torque 140, thereby increasing a rotation speed of an input shaft of the transmission 130 (S30). Therefore, an input shaft of the transmission 130 may be rotated.

Further, the controller 100 may be configured to adjust the stroke of the clutch actuator 120 to be the second target value, thereby releasing the baulking phenomenon of the transmission gear. In particular, the second target value may be set to be equal to or greater than a stroke value that corresponds to a touch point (TP) of a transmission clutch. In other words, the controller 100 may be configured to adjust the stroke of the clutch actuator 120 to be equal to or greater than the stroke value that corresponds to the touch point, and thus, the transmission gear may be misaligned due to the input shaft of the transmission 130 rotated by being engaged with the transmission clutch 133.

In this application, after the adjustment of the stroke (S40), the controller 100 may be configured to again compare the stroke of the gear actuator 110 with the first target value while increasing the stroke of the gear actuator 110 to determine whether the baulking of the transmission gear is released. When the stroke of the gear actuator 110 is less than the first target value again, the controller may be configured to determine that the baulking is not released and thus the detecting process (S20) may be repeated and when the stroke of the gear actuator 110 is equal to or greater than the first target value, the controller may be configured to determine that the baulking phenomenon is released and thus the logic of this application may end.

Meanwhile, as a result of performing the detecting process (S20), when the vehicle does not stop, the controller 100 may be configured to immediately perform the adjustment of the stroke (S40). In other words, when the vehicle is being driven, the input shaft of the transmission may be in a rotation state by the motor 140 or the engine 150. Therefore, the adjustment of the stroke (S40) may be immediately performed and thus the transmission gear may be adjusted to be misaligned, thereby releasing the baulking phenomenon. Further, the controller 100 may be configured to detect that the vehicle is in a stop state when a vehicle speed or the rotation speed of the motor 140 is 0.

Furthermore, in the increasing of the motor torque (S30), the controller 100 may be configured to transmit a signal requesting the increase in the motor torque to a hybrid control unit (HCU) 200 and may be configured to transmit the signal to maintain the rotation speed of the motor 140 to be equal to or less than a set value. In particular, the vehicle controller 200 may be configured to adjust the motor torque based on the signal transmitted by the controller 100, in which the controller 100 transmits the control signal to the vehicle controller 200 to increase the motor torque, thereby rotating the input shaft of the transmission 130.

Particularly, when the motor torque is excessively increased, the rotation speed of the motor 140 may be increased and thus, the vehicle launch may occur contrary to the driver's intention, which may lead to an accident. Therefore, the controller 100 may be configured to transmit a motor torque increase signal to the vehicle controller 200 so that the rotation speed of the motor 140 has the set value, that is, the rotation speed enough not to launch the vehicle, thereby preventing the vehicle from being suddenly launched. The vehicle controller 200 may be configured to detect the rotation speed of the motor 140 and the controller 100 may be configured to transmit and receive the information regarding the rotation speed of the motor 140 to the vehicle controller 200, to thus increase the motor torque while allowing the rotation speed of the motor not to exceed the set value.

According to the method for releasing baulking of a transmission gear of a hybrid vehicle having the foregoing structure, the baulking may be released even though the baulking phenomenon occurs when the hybrid vehicle is stopping and therefore the vehicle may not be driven in the limp-home mode, such that the driver's discomfort may be minimized and the marketability of the hybrid vehicle may be improved.

Although the present invention has been shown and described with respect to specific exemplary embodiments, it will be obvious to those skilled in the art that the present invention may be variously modified and altered without departing from the spirit and scope of the present invention as defined by the following claims.

What is claimed is:

1. A method for releasing baulking of a transmission gear of a hybrid vehicle, comprising:
    comparing, by a controller, a stroke of a gear actuator with a first target value while increasing the stroke of the gear actuator when gear shifting is requested;
    detecting, by the controller, whether the vehicle is in a stop state, in response to determining that the stroke of the gear actuator is less than the first target value;
    increasing, by the controller, a motor torque, in response to determining that the vehicle is in a stop state; and
    after increasing the motor torque, adjusting, by the controller, a stroke of a clutch actuator to be a second target value.

2. The method of claim 1, wherein in response to determining that the vehicle does not stop, the controller is configured to perform an adjustment of the stroke of the clutch actuator to be the second target value.

3. The method of claim 1, wherein the controller is configured to detect that the vehicle is in the stop state when a vehicle speed or a rotation speed of a motor is 0.

4. The method of claim 1, wherein in the increasing of the motor torque, the controller is configured to transmit a signal requesting the increase in the motor torque to a hybrid control unit (HCU) to allow a rotation speed of a motor to be equal to or less than a set value.

5. The method of claim 1, wherein the second target value is set to be equal to or greater than a stroke value that corresponds to a touch point of a clutch.

6. The method of claim 1, wherein after an adjustment of the stroke of the clutch actuator, the controller is configured to repeat the comparison of the stroke of the gear actuator with the first target value.

7. A system for releasing baulking of a transmission gear of a hybrid vehicle, comprising:
    a memory configured to store program instructions; and
    a processor configured to execute the program instructions, the program instructions when executed configured to:
        compare a stroke of a gear actuator with a first target value while increasing the stroke of the gear actuator when gear shifting is requested;
        detect whether the vehicle is in a stop state, in response to determining that the stroke of the gear actuator is less than the first target value;
        increase a motor torque, in response to determining that the vehicle is in a stop state; and
        after increasing the motor torque, adjust a stroke of a clutch actuator to be a second target value.

8. The system of claim 7, wherein in response to determining that the vehicle does not stop, the program instructions when executed are further configured to perform an adjustment of the stroke of the clutch actuator to be the second target value.

9. The system of claim 7, wherein the program instructions when executed are further configured to detect that the vehicle is in the stop state when a vehicle speed or a rotation speed of a motor is 0.

10. The system of claim 7, wherein in the increasing of the motor torque, the program instructions when executed are further configured transmit a signal requesting the increase in the motor torque to a hybrid control unit (HCU) to allow a rotation speed of a motor to be equal to or less than a set value.

11. The system of claim 7, wherein the second target value is set to be equal to or greater than a stroke value that corresponds to a touch point of a clutch.

12. The system of claim 7, wherein after an adjustment of the stroke of the clutch actuator, the program instructions when executed are further configured repeat the comparison of the stroke of the gear actuator with the first target value.

* * * * *